United States Patent
Day et al.

(10) Patent No.: US 7,103,748 B2
(45) Date of Patent: Sep. 5, 2006

(54) MEMORY MANAGEMENT FOR REAL-TIME APPLICATIONS

(75) Inventors: Michael Norman Day, Round Rock, TX (US); Harm Peter Hofstee, Austin, TX (US); Charles Ray Johns, Austin, TX (US); James Allan Kahle, Austin, TX (US); David Shippy, Austin, TX (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 10/318,541

(22) Filed: Dec. 12, 2002

(65) Prior Publication Data

US 2004/0117592 A1    Jun. 17, 2004

(51) Int. Cl.
*G06F 12/12*  (2006.01)
(52) U.S. Cl. .................. 711/207; 711/202; 711/203; 711/206; 711/159
(58) Field of Classification Search ............. 711/203, 711/204, 205, 206, 207, 208, 209
See application file for complete search history.

(56) References Cited

U.S. PATENT DOCUMENTS

| | | | |
|---|---|---|---|
| 4,727,485 A | | 2/1988 | Keshlear et al. |
| 5,487,162 A | * | 1/1996 | Tanaka et al. ............. 711/145 |
| 5,555,393 A | * | 9/1996 | Tanaka et al. ............. 711/133 |
| 5,594,886 A | | 1/1997 | Smith et al. |
| 5,796,978 A | * | 8/1998 | Yoshioka et al. ........... 711/206 |
| 6,047,354 A | * | 4/2000 | Yoshioka et al. ........... 711/118 |
| 6,430,667 B1 | * | 8/2002 | Loen ......................... 711/202 |
| 6,442,664 B1 | * | 8/2002 | Maynard et al. ............ 711/203 |
| 2002/0053006 A1 | | 5/2002 | Kawamoto et al. |
| 2003/0159003 A1 | | 8/2003 | Gaskins et al. |
| 2004/0143708 A1 | | 7/2004 | Caprioli |

FOREIGN PATENT DOCUMENTS

| | | |
|---|---|---|
| EP | 0 856 797 A1 | 8/1988 |
| EP | 1 182 569 A1 | 2/2002 |

OTHER PUBLICATIONS

Demaine, Erik D. "Cache-Oblivious Algorithms and Data Structures", Lecture Notes in Computer Science, BRICS, University of Aarhus, Denmark, Jun. 27-Jul. 1, 2002, pp. 1-29.
Al-Zoubi et al. "Performance Evaluation of Cache Replacement Policies for the SPEC2000 Benchmark Suite". 2004. Proceedings of the 42nd Annual ACM Southeast Regional Conference, ACM, pp. 267-272.

* cited by examiner

*Primary Examiner*—Mano Padmanabhan
*Assistant Examiner*—Jasmine Song
(74) *Attorney, Agent, or Firm*—Carr LLP; Diana R. Gerhardt

(57) ABSTRACT

Memory management in a computer system is improved by preventing a subset of address translation information from being replaced with other types of address translation information in a cache memory reserved for storing such address translation information for faster access by a CPU. This way, the CPU can identify the subset of address translation information stored in the cache.

14 Claims, 3 Drawing Sheets

226

8 TLB SETS

|   | 0 | 1 | 2 | 3 | 4 | 5 | 6 | 7 |
|---|---|---|---|---|---|---|---|---|
| 0 | 1 | 1 | 1 | 0 | 0 | 0 | 0 | 0 |
| 1 | 0 | 0 | 0 | 1 | 0 | 0 | 0 | 0 |
| 2 | 0 | 0 | 0 | 0 | 0 | 0 | 0 | 1 |
| 3 | 0 | 0 | 0 | 0 | 0 | 0 | 0 | 1 |
| 4 | 0 | 0 | 0 | 0 | 1 | 1 | 1 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |

8 CLASS IDS

*Fig. 3*

MEMORY MANAGEMENT FOR REAL-TIME APPLICATIONS

BACKGROUND OF THE INVENTION

1. Field of the Invention

The invention relates generally to memory management in a computer system and, more particularly, to an improved memory address translation mechanism for boosting performance of real-time applications running on a computer system.

2. Description of the Related Art

In a modern computer system, a technique known as virtual memory is used to manage the resource of physical or real memory of the computer system. This technique provides to the application an illusion of a very large amount of memory. Originally, the virtual memory system was developed to solve the problem of having too little physical or real memory. Although this may no longer be a factor in most modern systems having plenty of memory, the virtual memory mechanism itself has proven valuable for other reasons. Among these reasons, the virtual memory mechanism simplifies memory allocation and/or memory protection as well as application program design.

In a virtual memory system, virtual addresses are translated into real addresses with page tables having a plurality of page table entries (PTEs). Typically, such page tables are stored in a main memory of the computer system such as a DRAM chip. However, there is a bottleneck between the CPU and the main memory since the memory bus connecting between the CPU and the main memory is much slower than the operating speed of the CPU. For certain applications that do not require real-time response, this bottleneck may not pose a legitimate concern. However, many real-time applications may find this bottleneck causing a discernable delay in the operation of such applications.

A known technique to get around this bottleneck problem is to store PTEs in a special cache called a translation lookaside buffer (TLB), which is close to the Central Processing Unit (CPU). Typically, the TLB resides on-chip within the CPU to eliminate or significantly reduce any delay associated with looking up page tables in a main memory, as long as a particular set of PTE(s) searched by the CPU happens to be stored in the TLB. When the particular set of PTE(s) is not found in the TLB, this event is typically defined as a TLB miss.

Generally, as memory read and/or write requests are made, the mapping from the virtual to real memory is cached in the TLB. When there is a TLB miss, either dedicated hardware or software must reload the TLB with the correct PTE. A software reload as well as hardware reload of the TLB can be fairly costly in terms of performance, because such a reload would require reading PTEs from the main memory and looking for a match. Typically, it can take up to three cache line misses to find a match. In real-time applications, therefore, it is undesirable to have a TLB miss.

Therefore, there is a need for a system and method for managing memory for real-time applications in a computer system.

SUMMARY OF THE INVENTION

The present invention provides a system and method for improving memory management in a computer system. The computer system has a processing logic and a first and second memory. The first memory stores address translation information between virtual addresses and real addresses. The second memory caches at least part of the address translation information for faster access from the processing logic. At least a portion of the address translation information includes a subset of address translation information. The second memory is more proximal to the processing logic than is the first memory. The system and method prevents the subset of address translation information from being replaced with other address translation information stored in the first memory.

BRIEF DESCRIPTION OF THE DRAWINGS

For a more complete understanding of the present invention and the advantages thereof, reference is now made to the following descriptions taken in conjunction with the accompanying drawings, in which:

FIG. 3 is an example of a replacement management table (RMT) to be used in conjunction with the improved memory management mechanism of FIG. 2.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
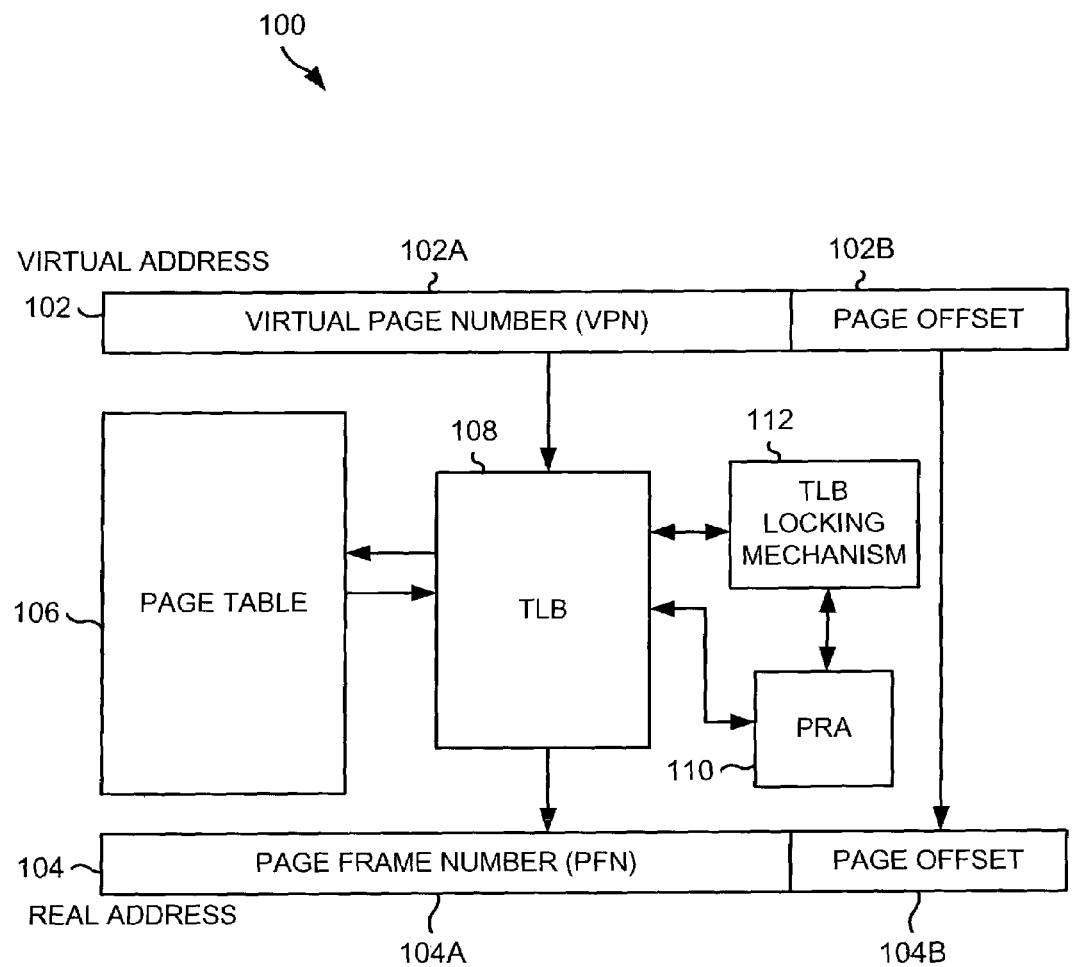
FIG. 1 is a high-level block diagram illustrating an improved memory management mechanism for real-time applications.

Referring to FIG. 1 of the drawings, the reference numeral 100 generally designates a high-level block diagram illustrating an improved memory management mechanism for real-time applications. Generally, the high-level block diagram 100 is applicable to a computer system using virtual memory. Most modern computer systems are included in this category. A virtual address 102 is translated into a real or physical address 104 using page table entries (PTEs) (not shown) stored in a page table 106 and a table lookaside buffer (TLB) 108. Specifically, the virtual address 102 includes a virtual page number (VPN) 102A and a page offset 102B. Similarly, the real address 104 includes a page frame number (PFN) 104A and a page offset 104B. Preferably, only the VPN 102A of the virtual address 102 is translated into the PFN 104A of the real address 104. The page offset 102B is copied to the page offset 104B without modification.

A hardware and/or software page replacement algorithm (PRA) 110 is also used to assist the TLB when there is a TLB miss and a PTE in the TLB has to be replaced with a new PTE (containing the missing page) from the page table 106. A TLB locking mechanism 112 interacts with the TLB 108 and PRA 110 for improving the memory management mechanism 100 for real-time applications.

At least a central processing unit (CPU) (not shown) controls directly or indirectly most operations and/or computations necessary in this context unless indicated otherwise. Also, a memory (not shown) coupled to the CPU stores the page table 106. If implemented in hardware, the PRA 110 is coupled to the TLB 108 and the TLB locking mechanism 112. If implemented in software, the PRA 110 is stored in a memory (not shown) and will be executed by the CPU when a TLB miss occurs.

Generally, it takes a relatively long period of time (compared to presumably short clock cycle of the CPU) for the CPU to gain access to the memory storing the page table 106. The TLB 108 is a special cache used for dynamically storing part of the PTEs originally available from the page table 106. Specifically, the TLB 108 is an associative memory for storing a relatively small set of PTEs for fast access. Given the value of some field(s), a hardware mechanism in an associative memory searches all the records and returns the record whose field contains the given value. Given the VPN 102A, a hardware mechanism in the TLB 108 searches all PTEs in the TLB and returns the PFN 104A, provided that there is no TLB miss. Note that other types of associative memory may be used instead of the TLB 108 without departing from the true spirit of the present invention.

Typically, the TLB 108 is used to dynamically cache some of the PTEs that the CPU might use in the near future. The PRA 110 in effect predicts what pages the CPU might use in the near future and accordingly determines what PTEs should be stored in the TLB 108 at a given point of time. Currently, many different page replacement algorithms are known in the art including but not limited to a least-recently-used (LRU) algorithm (not shown). When there is a TLB miss, the LRU algorithm replaces a PTE that has been unused for the longest time (i.e., that has been least recently used) with a new PTE (e.g., the PTE that was missing in the TLB).

Although this page replacement scheme may optimize the overall performance of the memory management mechanism 100 over time, the scheme does not consider a potential adverse impact it might have on real-time applications. The TLB locking mechanism 112 is shown to overcome this problem by working with the TLB 108 and the PRA 110. Generally, the TLB locking mechanism 112 prevents a set of PTE(S) allocated for real-time applications from being replaced with another set of PTEs that belong in the page table 106. In other words, the TLB locking mechanism 112 locks the set of PTE(s) allocated for real-time applications such that the set of PTE(s) cannot be removed from the TLB 108, regardless of what the PRA 110 determines.

It is important to note that the present invention is not necessarily limited to real-time applications, although such applications should most likely benefit from the present invention. Generally, the present invention should be considered applicable to any type of application and/or any particular application(s) to be prevented from being replaced in the event of a TLB miss.

Figure 2:
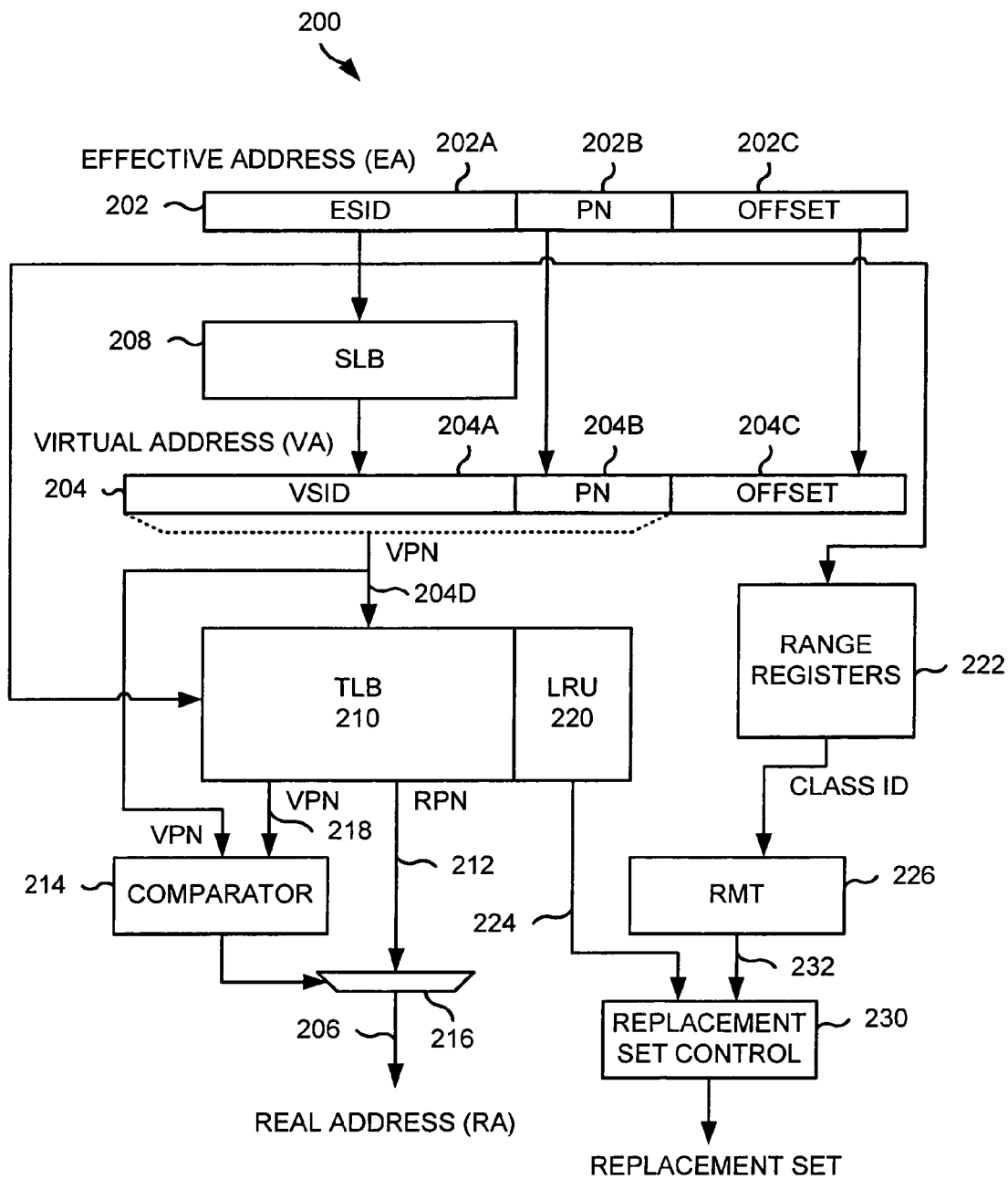
FIG. 2 is a low-level block diagram illustrating a preferred embodiment of an improved memory management mechanism for real-time applications.

Now referring to FIG. 2, a low-level block diagram 200 is shown to illustrate a preferred embodiment of an improved memory management mechanism for real-time applications. Generally, memory requests are made from a CPU (not shown) in the form of an effective address (EA) 202. The EA 202 is translated into a virtual address (VA) 204, which in turn is translated into a real address (RA) 206. The effective address (EA) includes an effective segment ID (ESID) 206A, page number (PN) 206B, and an offset 206C. Similarly, the VA 204 has a virtual segment ID (VSID) 204A, a page number (PN) 204B, and an offset 204C. Preferably, a virtual page number (VPN) 204D is created by concatenating the VSID 204A with the PN 204B.

The EA 202 is passed to a segment lookaside buffer (SLB) 208 and a translation lookaside buffer (TLB) 210. The SLB 208 is configured to translate the EA 202 into the VA 204. Preferably, the SLB 208,translates the ESID 202A into the VSID 204A, whereas the PN 202B and offset 202C are copied to the PN 204B and the offset 204C, respectively.

Given the VPN 204D and the EA 202, the CPU searches the TLB 210 for a match in page table entries (PTEs) (i.e., a PTE hit) by accessing all PTEs indexed by the EA 202 and comparing the VPN 204A. In the event there is a hit, a real page number 212 is returned. Preferably, a TAG comparator 214, along with a logic element 216, is used to perform such comparison. Specifically, the TAG comparator 214 enables the logic element 216 to pass the RPN 212 when the VPN 204D matches a VPN 218 in the TLB 210. When the VPN 204D does not match the VPN 218 in the TLB 210, the TAG comparator 214 prevents the logic element 216 from passing the RPN 212.

In the event there is a miss, a TLB reload mechanism (not shown) searches a page table (not shown) in a memory (not shown) and reloads the TLB 210. In a traditional TLB structure, when the TLB 210 is reloaded after a miss, a page replacement algorithm (PRA) 220, such as a least-recently-used (LRU) algorithm, is used to indicate which set of PTEs in a congruence class to replace.

In the event of a TLB reload, a set of range registers 222, Class IDs, a replacement set 224, a replacement management table (RMT) 226, and a replacement set control block 230 are used to select which set to replace. Specifically, the range registers 222 are coupled to the RMT 226 to transmit the Class IDs to the RMT 226. The TLB reload is accomplished by sending the EA 202 to the range registers 222. If there is a hit in the range registers 222, then a Class ID is generated and passed to the RMT 226. The RMT generates RMT replacement control bits, which is sent to the replacement set control block 230 via an RMT replacement control bus 232. The replacement set control block 230 uses the RMT replacement control bits and the replacement set 224 from the TLB 210 to determine which set to replace.

FIG. 3 shows an example of the RMT 226. In this example, the RMT 226 comprises a matrix of eight Class IDs (rows) crossed with eight TLB sets (columns). Preferably, the RMT 226 illustrates the decisions of the operating system software as to the replacement management status of the sets within the TLB 210, as they correlate to a given Class ID.

In a preferred embodiment, the RMT 226 is a software-managed table. Software maintains the structure and interprets the meaning of RMT entries. Generally, the RMT 226 is employed in the mapping of an effective address range to a set or sets of the TLB. Also, a Class ID (i.e., a row of the TLB 226) represents a given address range. In this example, Class ID 0 corresponds to any address range that is not specifically provided for by the other Class IDs. The given Class ID is then transmitted to and employed as an index by the RMT. Using the Class ID as an index, the RMT 226 is accessed and the information is transmitted on the RMT replacement control bus 232.

In this example, the RMT 226 is an eight by eight matrix. In other words, the TLB 210 is 8-way set associative (that is, it has 8 sets). Therefore, each RMT entry has 8 bits. Specifically, the RMT 226 has "1"s defined in Class ID row 0, from TLB sets 0–2, and "0"s in the rest of the row. Therefore, for Class ID 0, if the data is to be replaced to the TLB, it can be updated in the first three sets, sets 0–2 of the TLB. Furthermore, the Class ID 0 has exclusive use of these sets. Therefore, sets 0–2 of the TLB are exclusive to the Class ID 0. Class ID 0 provides a default Class ID for an address that does not hit in the range register.

For Class ID 1, the RMT has a "0" defined in sets 0–2 and sets 4–7, and a "1" for set 3. Any data corresponding to Class ID 1 is not to be replaced in sets 0–2 or sets 4–7. Instead, the data is to be replaced in set 3. Class ID 2 and Class ID 3 both replace the same set, set 7. Therefore, both Class ID 2 and Class ID 3 are to replace set 7 only. Class ID 4 has several sets that are valid candidates for replacement. These are sets 4, 5 and 6.

The final selection of set replacement is made by any page replacement algorithm (PRA), such as the LRU algorithm. In other words, certain sets are marked eligible for replacement by the RMT, and then an LRU algorithm control logic (not shown) contained in the replacement set select block 230 of FIG. 2 is used to finalize the selection of the set to be replaced.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

What is claimed is:

1. A method for improving memory management in a computer system having a processing logic and a first and second memory, the method comprising the steps of:
    storing address translation information between virtual addresses and real addresses in the first memory;
    caching at least part of the address translation information in the second memory for faster access from the processing logic, the part of the address translation information including a subset of address translation information, wherein the second memory is more proximal to the processing logic than is the first memory; and
    preventing the subset of address translation information from being replaced with other address translation information stored in the first memory;
    wherein the step of preventing the subset of address translation information from being replaced with other address translation information stored in the first memory further comprises the steps of:
    generating one or more Class IDs for a range register, each Class ID representing a given address range of an effective address;
    accessing a replacement management table (RMT) using the one or more Class IDs as indices;
    mapping the one or more Class IDs to one or more sets of the at least part of the address translation information;
    determining which set of the address translation information is eligible for replacement based on the RMT; and
    performing a replacement algorithm on only the set of the address translation determined to be eligible for replacement.

2. The method of claim 1, wherein the first and second memories are a main memory and translation lookaside buffer (TLB) of the computer system, respectively.

3. The method of claim 1, wherein the address translation information is stored in one or more page tables having one or more page table entries (PTEs).

4. The method of claim 1, wherein the subset of address translation information is allocated for real-time application(s).

5. The method of claim 3, wherein the replacement algorithm includes a page replacement algorithm.

6. The method of claim 5, wherein the page replacement algorithm includes a least-recently-used (LRU) algorithm.

7. An improved memory management mechanism in a computer system having a processing logic, the memory management mechanism comprising:
    a first memory coupled to the processing logic for storing address translation information between virtual addresses and real addresses;
    a second memory coupled to the processing logic and located more proximal to the processing logic than is the first memory for caching at least part of the address translation information for faster access from the processing logic, the part of the address translation information including a subset of address translation information; and
    means for preventing the subset of address translation information from being replaced with other address translation information stored in the first memory;
    wherein the means for preventing the subset of address translation information from being replaced with other address translation information stored in the first memory further comprises:
    means for generating one or more Class IDs for a range register, each Class ID representing a given address range of an effective address;
    means for accessing a replacement management table (RMT) using the one or more Class IDs as indices;
    means for mapping the one or more Class IDs to one or more sets of the at least part of the address translation information;
    means for determining which set of the address translation information is eligible for replacement based on the RMT; and
    means for performing a replacement algorithm on only the set of the address translation determined to be eligible for replacement.

8. The improved memory management mechanism of claim 7, wherein the first and second memories are a main memory and translation lookaside buffer (TLB) of the computer system, respectively.

9. The improved memory management mechanism of claim 7, wherein the address translation information is stored in one or more page tables having one or more page table entries (PTEs).

10. The improved memory management mechanism of claim 7, wherein the subset of address translation information is allocated for real-time application(s).

11. The improved memory management mechanism of claim 9, wherein the replacement algorithm includes a page replacement algorithm.

12. The improved memory management mechanism of claim 11, wherein the page replacement algorithm includes a least-recently-used (LRU) algorithm.

13. An improved memory management mechanism in a computer system having a processing logic;
    wherein the processing logic is configured for making a memory request in the form of an effective address;
    and wherein the memory management mechanism comprises:
    a first memory coupled to the processing logic for storing address translation information between virtual addresses and real addresses;

a second memory coupled to the processing logic and located more proximal to the processing logic than is the first memory for caching at least part of the address translation information for faster access from the processing logic, the part of the address translation information including a subset of address translation information; and means for preventing the subset of address translation information from being replaced with other address translation information stored in the first memory;

a segment lookaside buffer (SLB) coupled to the processing logic for generating a virtual address corresponding to the effective address; and a replacement management table (RMT) for mapping one or more Class IDs to one or more sets of the at least part of the address translation information, each Class ID representing a given address range of the effective address.

14. A computer program product for improving memory management in a computer system having a processing logic and a first and second memory, the computer program product having a medium with a computer program embodied thereon, the computer program comprising:

computer program code for storing address translation information between virtual addresses and real addresses in the first memory;

computer program code for caching at least part of the address translation information in the second memory for faster access from the processing logic, the part of the address translation information including a subset of address translation information, wherein the second memory is more proximal to the processing logic than is the first memory; and computer program code for preventing the subset of address translation information from being replaced with other address translation information stored in the first memory;

wherein the computer program code for preventing the subset of address translation information from being replaced with other address translation information stored in the first memory further comprises:

computer program code for generating one or more Class IDs for a range register, each Class ID representing a given address range of an effective address;

computer program code for accessing a replacement management table (RMT) using the one or more Class IDs as indices;

computer program code for mapping the one or more Class IDs to one or more sets of the at least part of the address translation information;

computer program code for determining which set of the address translation information is eligible for replacement based on the RMT; and computer program code for performing a replacement algorithm on only the set of the address translation determined to be eligible for replacement.

* * * * *